Patented Sept. 28, 1943

2,330,307

UNITED STATES PATENT OFFICE 2,330,307

PROCESS OF SMELTING ANTIMONY ORE

Charles O'Keefe, Nogales, Ariz.

No Drawing. Application March 14, 1942,
Serial No. 434,775

4 Claims. (Cl. 75—69)

This invention relates to a process for obtaining antimony from antimony trioxide.

An object of the invention is the provision of a process for obtaining antimony from the trioxide in a simple and economical manner; the efficacy depending upon the type of crucible in which the trioxide is heated.

A further object of the invention is the provision of a process for obtaining antimony from the trioxide in which the trioxide is reduced by a predetermined percentage of carbon in crucibles which are made of sodium sulphate, sodium chloride, and an alkali or an alkaline earth. The alkali employed is preferably sodium carbonate although calcium oxide may also be used. The salts in all cases are dehydrated.

A still further object of the invention is the provision of a crucible formed of salts which will prevent or retard the fuming of antimony trioxide when reduced in a blast furnace or a reverberatory furnace, the reduction of the trioxide being accomplished by means of carbon intimately mixed with the trioxide and sealed in the crucibles.

This invention will be best understood from a consideration of the following detailed description; nevertheless, it is to be understood that the invention is not confined to the disclosure, being susceptible of such changes and modifications as define no material departure from the salient features of the invention as expressed in the appended claims.

In carrying out the process, it has been found that the mineral senarmontite is the cheapest and easiest ore for roasting purposes, for the production of antimony trioxide. After the roasting has been completed, the flue dust and fumes are collected in an appropriate fume collector. These products are then ready to be reduced.

It is well known that Glauber salt and charcoal are used to remove copper and iron, as sulphates and arsenic, as sodium arsenate. Chlorides have also been used but with caution because there is danger of a great loss by volatilization, particularly since the antimonious oxide fumes at a relatively low temperature in a reducing atmosphere.

The present method employs well-known salts including a chloride, but a particular feature of the invention is the mechanical retardation or the prevention of the fuming of the antimony trioxide until the heat of the furnace raises the carbon which has been mixed with the trioxide to such a temperature as will reduce the antimonious oxide to metallic antimony.

In order to prevent loss by volatilization particularly where a chloride is used, I first manufacture a crucible formed of a slag which is composed of approximately equal parts of sodium sulphate and common salt. To this mixture may be added sodium carbonate or calcium oxide, although both of the last two mentioned ingredients may be eliminated. When a blast furnace is used, calcium oxide is employed as one of the ingredients and the proportions are as follows: 20% calcium oxide, 40% sodium chloride, and 40% sodium sulphate.

The slag may also be formed of calcium sulphate and common salt and to this may be added sodium carbonate or calcium oxide.

After the crucibles have been formed from the slag as described above, the antimony trioxide which had been obtained from the fume collector is thoroughly mixed with the requisite amount of carbon. This mixture is then placed in the crucibles and covered with some of the cold granulated slag, after which the crucibles are sealed with some of the hot slag.

The charged crucibles are then placed in a reverberatory furnace.

The high heat of approximately 1300° C. of the furnace will reduce the metallic antimony and although sodium chloride has been used as part of the slag, nevertheless, the reduction of the trioxide in the sealed crucibles prevents loss by volatilization because the slag which is made from the various salts noted above, tends to melt at, or near the temperature that the carbon burns and thus the slag retards or prohibits fuming of the trioxide. This is true whether the sealed crucibles are heated in a reverberatory furnace or a blast furnace, since the mixture of the carbon and trioxide is completely enclosed and sealed within the crucibles formed of a slag described above. Glauber salt like the chlorides is volatile at high temperatures. However, the ingredients forming the crucible flux at the approximate temperature when the carbon burns to form a slag which covers the metal and the flux reacts with the impurities.

The various salts forming the slag are heated and this hot slag is poured into molds to form the crucibles in which the mixture of the carbon and trioxide is placed.

By placing the antimony trioxide and carbon in the cool crucible made of the slag and covering the open end of the crucible with the slag, a more convenient method is provided for handling the materials than by rabbling the antimony trioxide together with a reducing agent and the necessary fluxing agents in a furnace.

It will be appreciated that during the heating of the crucibles and their contents the slag functions to purify the antimony.

Approximately 12% of carbon is mixed with the antimony trioxide after said trioxide has been obtained from the fume collector to form the mixture which is placed in the crucible.

I claim:

1. The method of producing antimony from antimony trioxide which comprises mixing antimony trioxide with carbon, forming a crucible of hot slag composed of dehydrated sodium sulphate and sodium chloride, filling said crucible with the mixture of carbon and antimony trioxide and sealing the filled crucible with the hot slag, then heating the crucible and its contents, until the crucible melts to form a flux which reacts with the impurities.

2. The method of recovering antimony from antimony trioxide which comprises forming a crucible of a hot slag composed of sodium sulphate and sodium chloride, filling said crucible with a mixture of carbon and antimony trioxide, covering the mixture with some of the slag which has been cooled and granulated, sealing the crucible with the hot slag, then heating the filled and sealed crucible to a high temperature, so that the ingredients forming the crucible will flux and react with the impurities.

3. The method of recovering antimony from antimony trioxide which comprises forming a crucible of a hot slag composed of sodium sulphate, sodium chloride and sodium carbonate, filling said crucible with a mixture of antimony trioxide and carbon, sealing the crucible with hot slag, then heating the crucible and its contents so that the ingredients forming the crucible will flux and react with the impurities to reduce the trioxide to antimony.

4. The method of recovering antimony from antimony trioxide which comprises forming a crucible of a hot slag composed of sodium sulphate, sodium chloride and sodium carbonate, filling said crucible with a mixture of antimony trioxide and carbon, covering the mixture with cold granulated slag, sealing the crucible with hot slag, then heating the crucible and its contents so that the ingredients forming the crucible will flux and react with the impurities to reduce the trioxide to antimony.

CHAS. O'KEEFE.